(12) United States Patent
Bowers (10) Patent No.: US 8,780,238 B2
(45) Date of Patent: Jul. 15, 2014

(54) SYSTEMS AND METHODS FOR BINNING PIXELS

(75) Inventor: Gabriel Bowers, Berkeley, CA (US)

(73) Assignee: Aptina Imaging Corporation, George Town (KY)

( * ) Notice: Subject to any disclaimer, the term of this patent is extended or adjusted under 35 U.S.C. 154(b) by 381 days.

(21) Appl. No.: 13/149,810

(22) Filed: May 31, 2011

(65) Prior Publication Data

US 2012/0194720 A1     Aug. 2, 2012

Related U.S. Application Data

(60) Provisional application No. 61/437,391, filed on Jan. 28, 2011.

(51) Int. Cl.
| | |
|---|---|
| *H04N 5/228* | (2006.01) |
| *H04N 9/083* | (2006.01) |
| *H04N 3/14* | (2006.01) |
| *H04N 5/335* | (2011.01) |
| *H04N 9/04* | (2006.01) |
| *G06K 9/32* | (2006.01) |

(52) U.S. Cl.
USPC ......... 348/280; 348/222.1; 348/273; 382/299

(58) Field of Classification Search
USPC ........ 348/222.1, 273, 280; 382/166, 298–300
See application file for complete search history.

(56) References Cited

U.S. PATENT DOCUMENTS

| | | | |
|---|---|---|---|
| 7,091,466 B2 | 8/2006 | Bock | |
| 7,402,789 B2 | 7/2008 | Bock | |
| 7,417,670 B1* | 8/2008 | Linzer et al. | 348/222.1 |
| 7,903,871 B2* | 3/2011 | Kaplinsky et al. | 382/162 |
| 8,107,775 B2* | 1/2012 | Onomura | 382/300 |
| 2006/0077269 A1 | 4/2006 | Kindt | |
| 2006/0203113 A1* | 9/2006 | Wada et al. | 348/302 |
| 2007/0030366 A1 | 2/2007 | Compton | |
| 2008/0205792 A1* | 8/2008 | Andersen | 382/299 |
| 2008/0260291 A1* | 10/2008 | Alakarhu et al. | 382/298 |
| 2011/0063473 A1* | 3/2011 | Tsunekawa et al. | 348/222.1 |
| 2012/0081580 A1* | 4/2012 | Cote et al. | 348/231.99 |

* cited by examiner

*Primary Examiner* — Daniel M Pasiewicz
(74) *Attorney, Agent, or Firm* — Treyz Law Group; Chih-Yun Wu (57) ABSTRACT

An imager may be configured to perform pixel binning on captured images. Pixel binning may be performed by forming groups of pixels and combining sampled values from the pixels in each group. The sampled values from the pixels may be combined by assigning weights to each pixel, scaling the sampled values by the corresponding weights, and summing the scaled values. The groups of pixels and pixel weights may be selected to produce binned images with even spatial distribution. The pixel binning operation may be performed by processing circuitry that receives captured image data from the imager. The pixel binning operation may also be separated into a horizontal binning step and a vertical binning step that are performed by image readout circuitry during image readout. During the horizontal binning step, pixels of a particular row may be combined. During the vertical binning step, pixel rows may be combined.

13 Claims, 11 Drawing Sheets

|   | COLUMN | | | | | | | | | |
|---|---|---|---|---|---|---|---|---|---|---|
|   | 1 | 2 | 3 | 4 | 5 | 6 | 7 | 8 | 9 | 10 |
| 1 | R | G | R | G | R | G | R | G | R | G |
| 2 | G | B | G | B | G | B | G | B | G | B |
| 3 | R | G | R | G | R | G | R | G | R | G |
| 4 | G | B | G | B | G | B | G | B | G | B |
| 5 | R | G | R | G | R | G | R | G | R | G |
| 6 | G | B | G | B | G | B | G | B | G | B |
| 7 | R | G | R | G | R | G | R | G | R | G |
| 8 | G | B | G | B | G | B | G | B | G | B |
| 9 | R | G | R | G | R | G | R | G | R | G |
| 10 | G | B | G | B | G | B | G | B | G | B |

SYSTEMS AND METHODS FOR BINNING PIXELS

This application claims the benefit of provisional patent application No. 61/437,391, filed Jan. 28, 2011, which is hereby incorporated by reference herein in its entirety.

BACKGROUND

This relates generally to imaging systems, and more particularly, imaging systems that perform pixel binning.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

When capturing images (i.e., receiving incident light and converting the photons into electrical signals), an imager may perform pixel binning to obtain binned images with a resolution lower than a resolution (i.e., size) of a corresponding pixel array. The imager may form groups of pixels, combine the image signals generated by the pixels of each group to form binned pixels, and form binned images from the binned pixels with a resolution lower than the resolution of the original captured image. Binned images may have higher signal-to-noise rations in low-light situations than the corresponding original images.

Pixel binning performed by conventional imagers, however, results in uneven spatial distribution of pixels in the binned image. Therefore, it would be desirable to design an imager with improved pixel binning.

DETAILED DESCRIPTION

Figure 1:
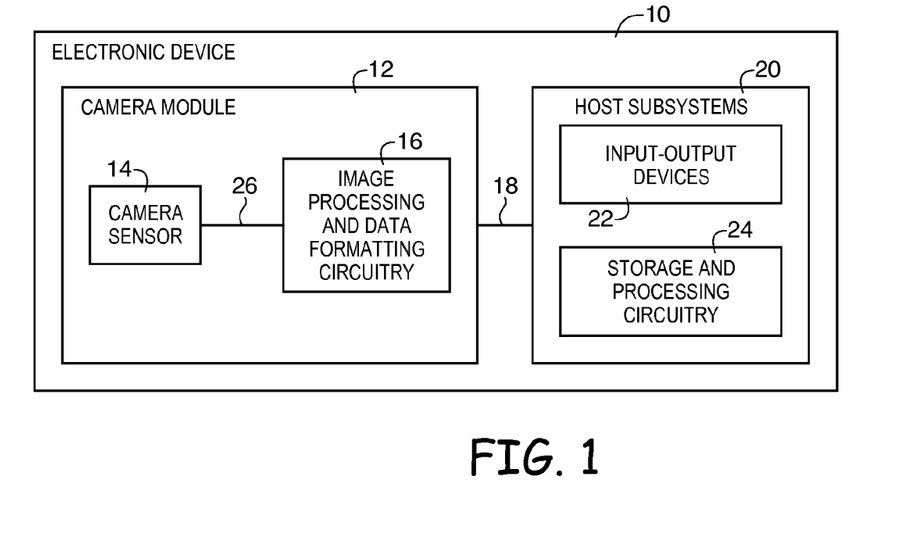
FIG. 1 is a diagram of an illustrative electronic device that includes an imager that performs pixel binning in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
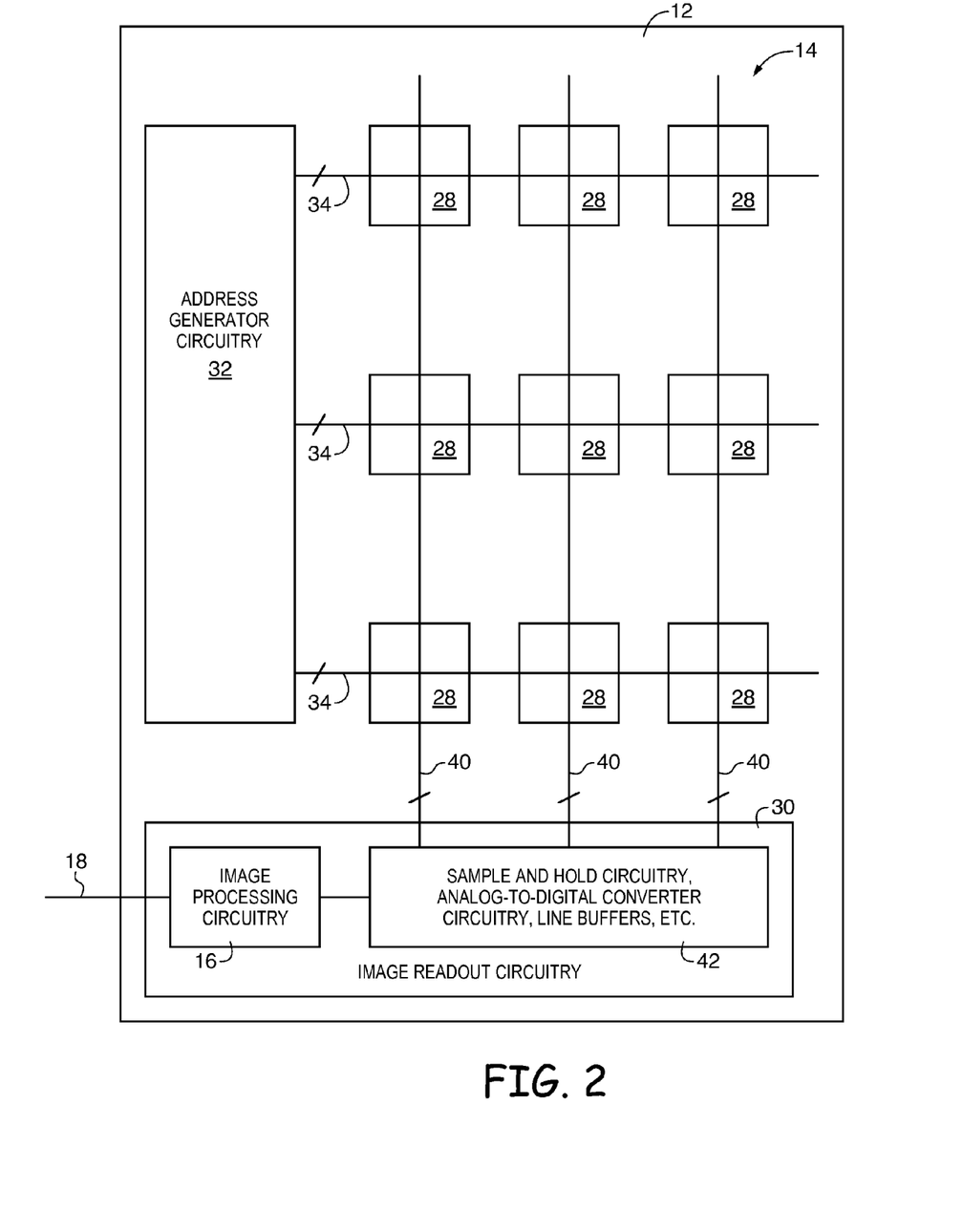
FIG. 2 is a diagram of an illustrative array of light-sensitive pixels and control circuitry coupled to the array of pixels in accordance with an embodiment of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Figure 3:
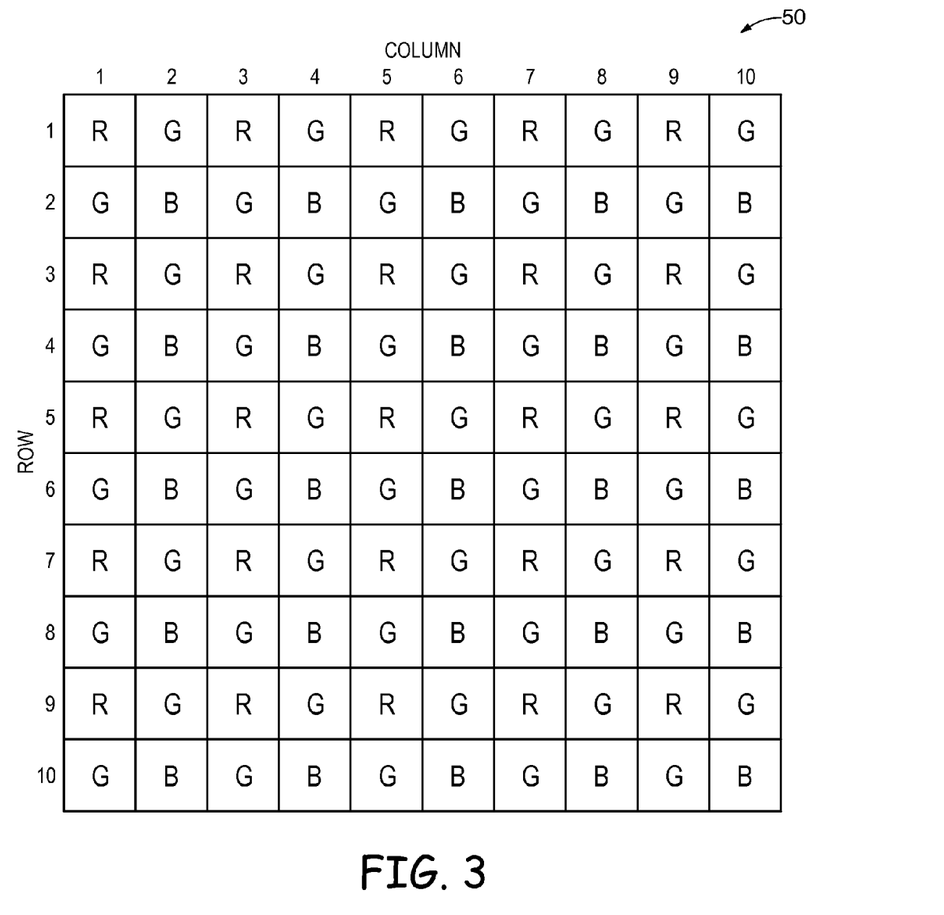
FIG. 3 is a diagram illustrating a Bayer pattern implemented with an illustrative array of light-sensitive pixels in accordance with an embodiment of the present invention.

Camera module 12 may perform pixel binning to increase the signal-to-noise ratio of images captured by camera sensor 14 (e.g., while sacrificing overall resolution). As an example, camera module 12 may perform pixel binning in low-light conditions. FIG. 3 shows an illustrative 2-dimensional pixel array 50 (e.g., array 14) that camera module 12 may use when performing pixel binning. In the diagram of FIG. 3, the pixels of pixel array 50 are arranged to conform to the Bayer pattern (e.g., the odd rows may correspond to alternating red pixels and green pixels and the even rows may correspond to alternating green and blue pixels). The green pixels in rows with red pixels may be referred to herein as green-red ($G_R$) pixels. The green pixels in rows with blue pixels may be referred to herein as green-blue ($G_B$) pixels. The pixels of pixel array 50 may be arranged in rows and columns to form a matrix. Each pixel of pixel array 50 may be herein referenced with the row and column pair associated with the location of the pixel (e.g., the red pixel located at row 1 and column 1 may be referred to as R(1,1) and the blue pixel located at row 4 and column 6 may be referred to as B(4,6)).

Figure 4:
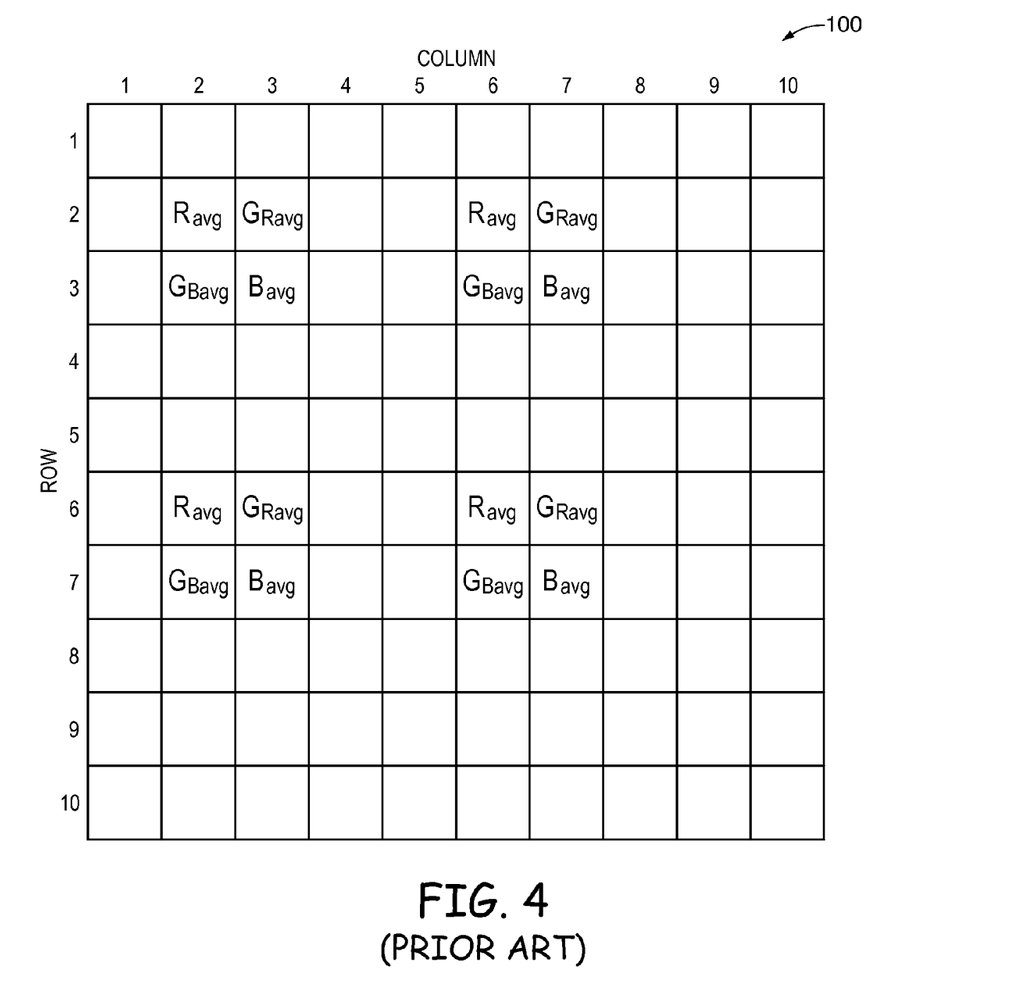
FIG. 4 is a diagram of the center locations of the binned pixels in a conventional binned image.

Conventional imagers perform pixel binning by grouping pixels into clusters and averaging the image signals of pixels in each cluster. An image binned by a conventional imager to reduce resolution by a factor of four is shown in FIG. 4. To reduce the image resolution by a factor of four, the conventional imager forms clusters consisting of 16 pixels arranged in a 4×4 square. The first cluster consists of the pixels in rows 1-4 and columns 1-4, the second cluster consists of the pixels in rows 1-4 and columns 4-8, etc. To perform pixel binning on each cluster, the conventional imager averages image signals from pixels of the same color in each cluster. To perform pixel binning on the first cluster, the conventional imager averages the image signals from four red pixels R(1,1), R(1,3), R(3,1), and R(3,3), the image signals from four green-red pixels $G_R(1,2)$, $G_R(1,4)$, $G_R(3,2)$, and $G_R(3,4)$, the image signals from four green-blue pixels $G_B(2,1)$, $G_B(2,3)$, $G_B(4,1)$, and $G_B(4,3)$, and the image signals from four blue pixels B(2,2), B(2,4), B(4,2), and B(4,4).

Pixel binning performed by conventional imagers generates spatially uneven binned images. Due to the equal weight given to each of the four red pixels, averaging the image signals from red pixels in the first cluster results in a binned red pixel ($R_{avg}$) spatially located at (2,2). Averaging the image signals from green-red pixels in the first cluster results in a binned green-red pixel ($G_{Ravg}$) located at (2,3). Averaging the image signals from blue pixels in the first cluster produces a binned blue pixel ($B_{avg}$) located at (3,3). Averaging the image signals from green-blue pixels in the first cluster produces a binned blue pixel ($G_{Bavg}$) located at (3,2). As shown in FIG. 4, binned pixels of the same cluster are located adjacent to each other (e.g., $R_{avg}(2,2)$, $G_{Ravg}(2,3)$, $G_{Bavg}(3,2)$, and $B_{avg}(3,3)$ are located adjacent to each other), while binned pixels of different clusters are offset by three or more pixel indices (e.g., $R_{avg}(2,6)$ of the second cluster is offset by four pixel indices from $R_{avg}(2,2)$ of the first cluster). The uneven spatial distribution between binned pixels results in an uneven representation of the original image.

Figure 5A:
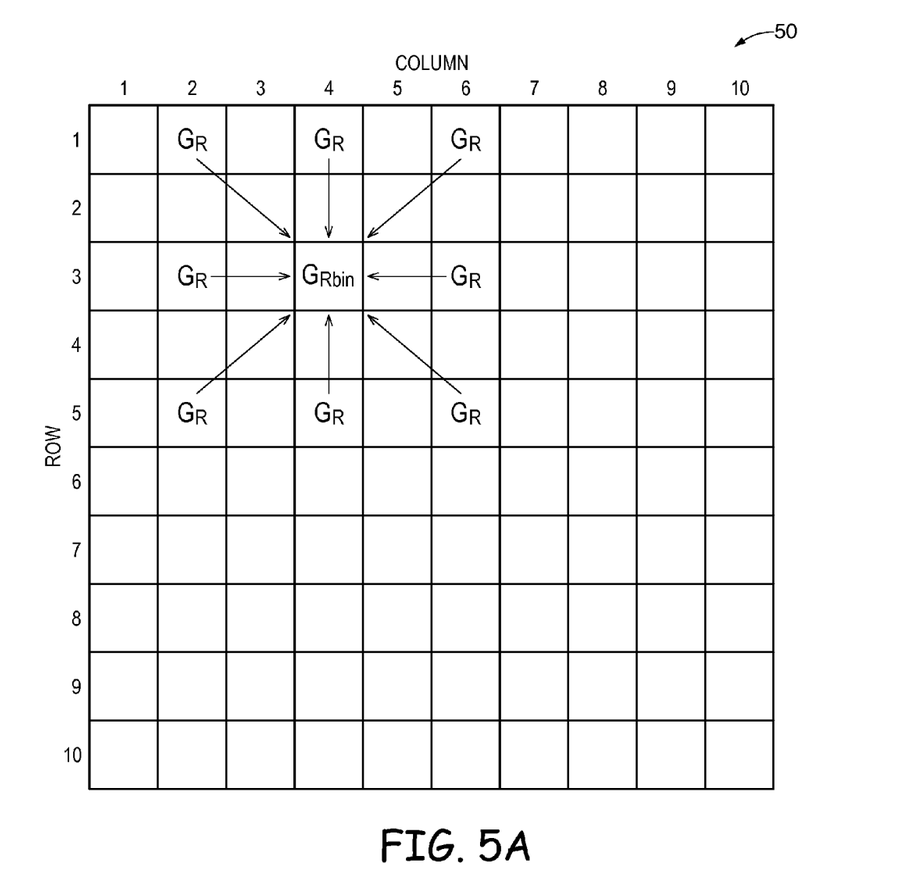
FIGS. 5A, 5B, 5C, and 5D are diagrams illustrating groupings of pixels for use during pixel binning in accordance with an embodiment of the present invention.

In FIGS. 5A-5D, a pixel binning process is illustrated that may evenly distribute binned pixels. In the diagram of FIG. 5A, an illustrative example of binning for a group of green-red pixels is shown. As shown in FIG. 5A, image signals from nine green-red pixels (e.g., green-red pixels at locations (1,2), (1,4), (1,6), (3,2), (3,4), (3,6), (5,2), (5,4), and (5,6)) are used to generate a combined image signal, which may be referred to herein as binned green-red pixel (e.g., $G_{Rbin}$ at location (3,4)). As an example, the nine green-red pixels may each be given associated weights and the image signal of the binned green-red pixel may be the sum of the image signals of the nine green-red pixels scaled by the corresponding weights. The corner green-red pixels (e.g., the green-red pixels located at (1,2), (1,6), (5,2) and (5,6)) may be given weights of 0.25, as an example. The side green-red pixels (e.g., the green-red pixels located at (1,4), (3,2), (3,6), and (5,4)) may be given weights of 0.5, as an example. The center pixel (e.g., the pixel at location (3,4)) may be given a weight of 1, as an example. The binned green-red pixel ($G_{Rbin}$) may be equal to the sum of the pixel values for each pixel category (e.g., corner, side, or center) scaled by the respective weights. As an example, the combined image signal associated with the binned green-red pixel ($G_{Rbin}$) at location (3,4) may be determined using equation 1.

$$G_{Rbin}(3,4)=G_R(3,4)+0.5*(G_R(1,4)+G_R(3,2)+G_R(3,6)+G_R(5,4))+0.25*(G_R(1,2)+G_R(1,6)+G_R(5,2)+G_R(5,6)) \quad (1)$$

The selection of weights associated with each pixel category may determine the spatial location of the binned green-red pixel ($G_{Rbin}$). For example, if the corner pixels are associated with weight 0.25, the side pixels are associated with weight 0.5, and the center pixel associated with weight 1, then the binned green-red pixel may be spatially located at (3,4).

Figure 5B:
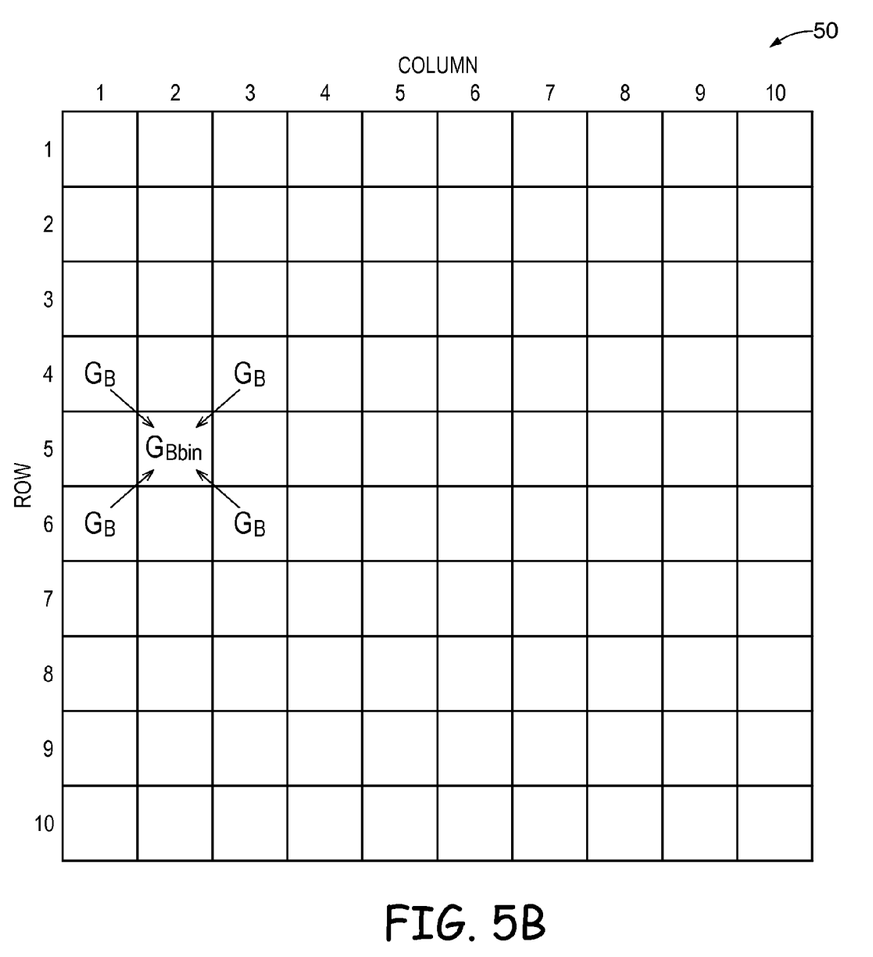

In the diagram of FIG. 5B, an example of pixel binning for a group of green-blue pixels is shown. As shown in FIG. 5B, four green-blue pixels (e.g., green-blue pixels at locations (4,1), (4,3), (6,1), and (6,3)) may be used to generate a single binned green-blue pixel (e.g., $G_{Bbin}$ spatially located at location (5, 2)). The image signals of the four green-blue pixels may be averaged together to generate the image signal for the binned green-blue pixel. As an example, the combined image signal associated with the binned green-blue pixel ($G_{Bbin}$) at location (5,2) may be determined using equation 2.

$$G_{Bbin}(5,2)=G_B(4,1)+G_B(4,3)+G_B(6,1)+G_R(6,3) \quad (2)$$

Figure 5C:
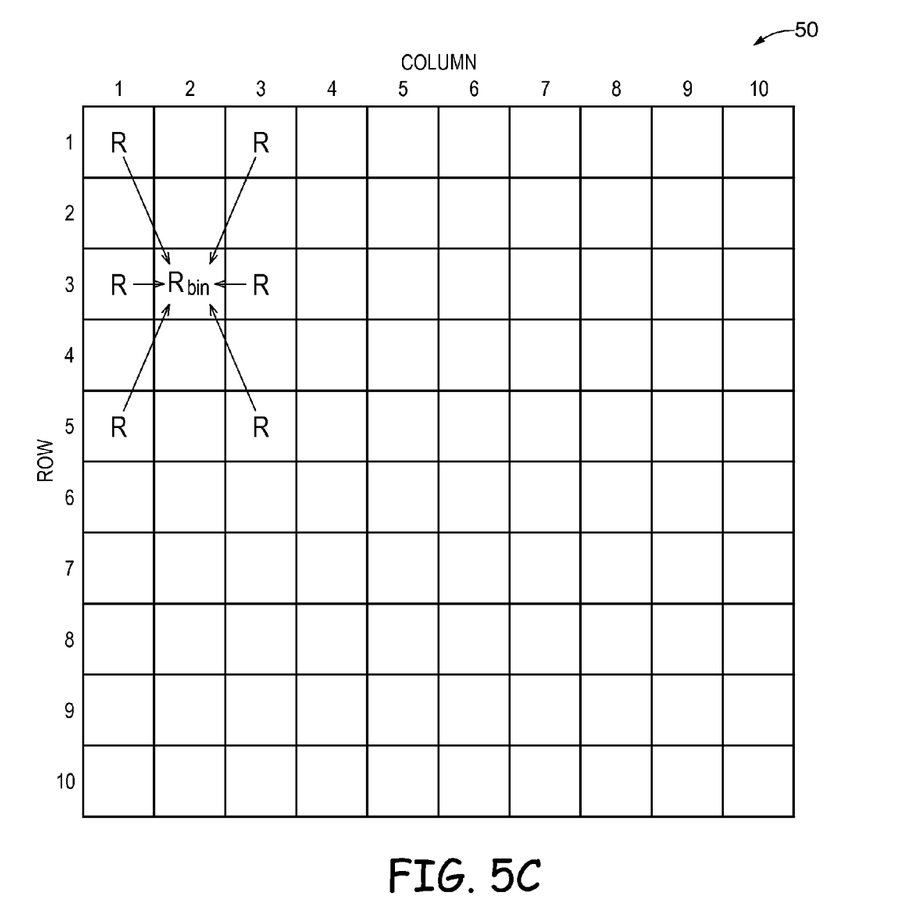

In the diagram of FIG. 5C, an example of pixel binning for a group of red pixels is shown. As shown in FIG. 5C, six red pixels (e.g., red pixels at locations (1,1), (1,3), (3,1), (3,3), (5,1), and (5,3)) may be used to generate a single binned red pixel (e.g., binned red pixel $R_{bin}$ spatially located at (3,2)). The six red pixels may each be given associated weights and the image signal of the binned red pixel may be the sum of the image signals of the nine red pixels scaled by their corresponding weights. For example, the corner red pixels (e.g., red pixels at locations (1,1), (1,3), (5,1), and (5,3)) may each be given weight 0.5 and the side red pixels (e.g., red pixels at locations (3,1) and (3,3)) may each be given weight 1. As an example, the combined image signal associated with the binned red pixel ($R_{bin}$) at location (3,2) may be determined using equation 3.

$$R_{bin}(3,2)=R(3,1)+R(3,3)+0.5*R(1,1)+R(1,3)+R(5,1)+R(5,3)) \quad (3)$$

The selection of weights associated with the side pixels and corner pixels may determine the spatial location of the binned red pixel ($R_{bin}$). As an example, the binned red pixel in the example of FIG. 5C may be spatially located at (3,2).

Figure 5D:
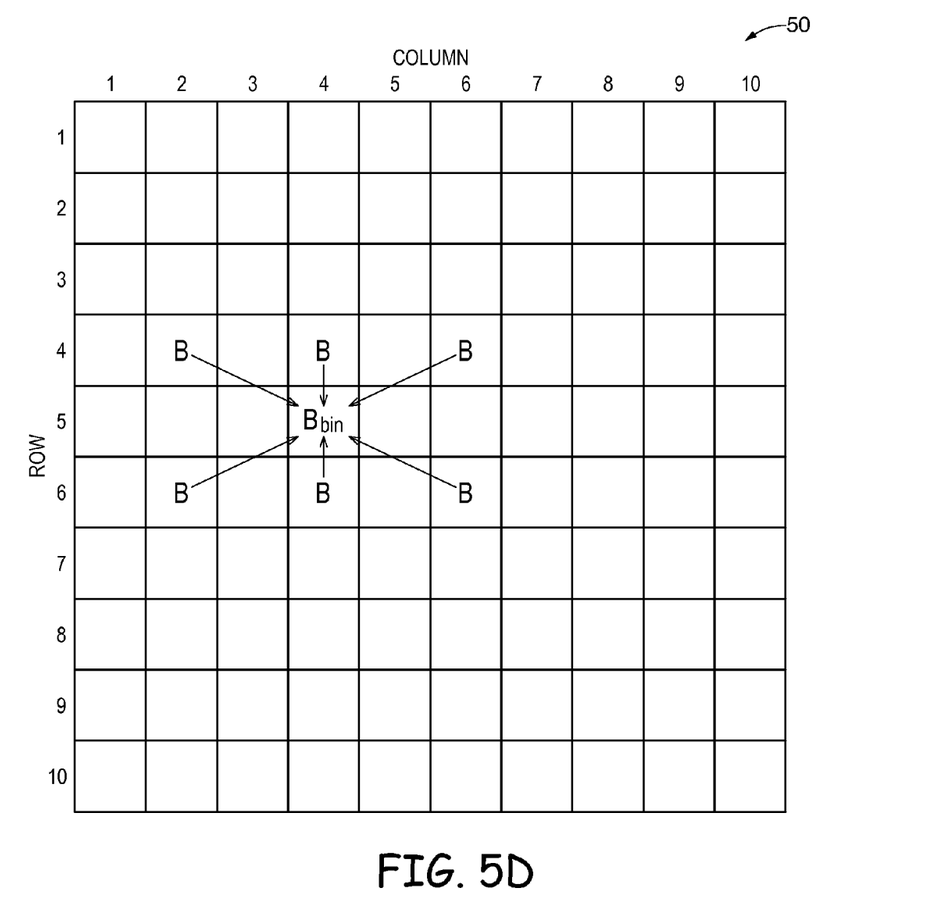

In the diagram of FIG. 5D, an example of pixel binning for a group of blue pixels is shown. As shown in FIG. 5D, image signals from six blue pixels (e.g., blue pixels at locations (4,2), (4,4), (4,6), (6,2), (6,4), and (6,6)) may be used to generate an image signal for a single binned blue pixel (e.g., binned blue pixel $B_{bin}$ spatially located at (5,4)). The six blue pixels may each be given associated weights and the image signal of the binned blue pixel may be the sum of the image signals of the six blue pixels scaled by their corresponding weights. For example, the corner blue pixels (e.g., blue pixels at locations (4,2), (4,6), (6,2), and (6,6)) may each be given weight 0.5 and the side blue pixels (e.g., blue pixels at locations (4,4) and (6,4)) may each be given weight 1. As an example, the combined image signal associated with the binned blue pixel ($B_{bin}$) at location (5,4) may be determined using equation 4.

$$B_{bin}(5,4) = B(4,4) + B(6,4) + 0.5*(B(4,2) + B(4,6) + B(6,2) + B(6,6)) \quad (4)$$

The selection of weights associated with the side pixels and corner pixels may determine the spatial location of the binned blue pixel ($B_{bin}$). As an example, the resulting binned blue pixel in the example of FIG. 5D may be spatially located at (5,4).

Binned pixels $G_{Rbin}$, $G_{Bbin}$, $B_{bin}$, and $R_{bin}$ (e.g., the binned pixels calculated using equations 1, 2, 3, and 4) may be normalized to form a final binned image. For example, $G_{Rbin}$, $G_{Bbin}$, $B_{bin}$, and $R_{bin}$ of equation 1, 2, 3, and 4 may each be divided by four to form a final binned image.

Figure 5E:
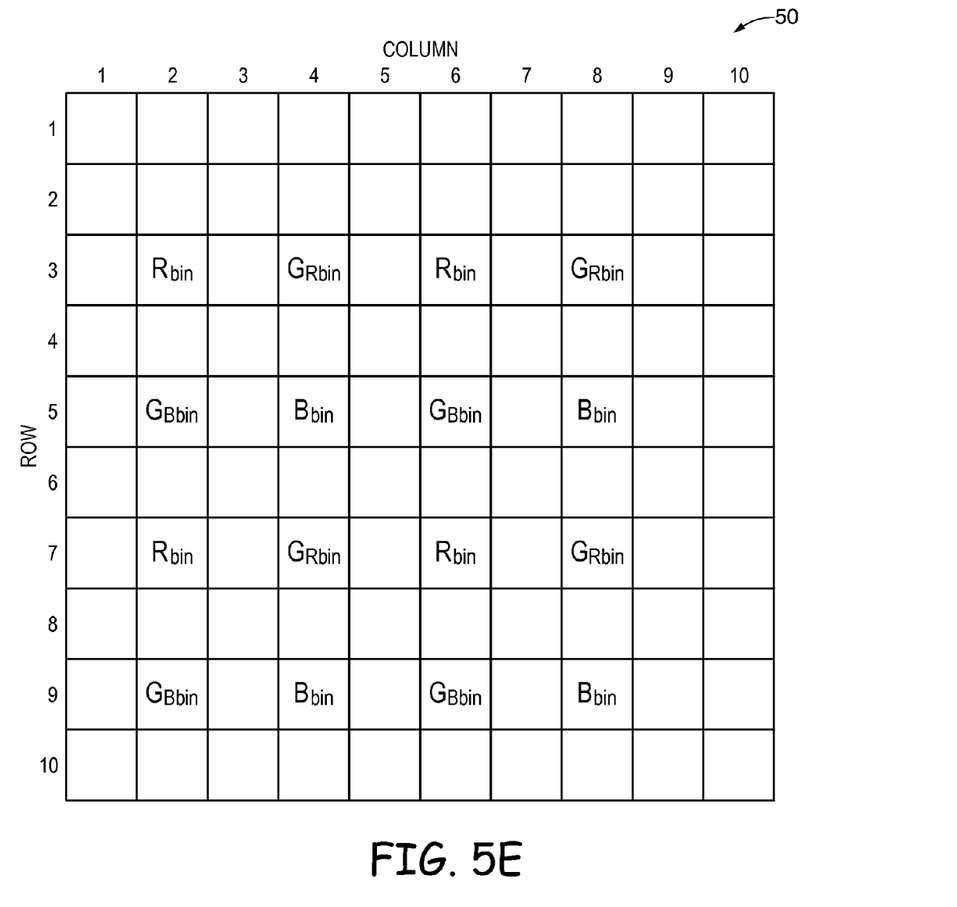
FIG. 5E is a diagram of an illustrative binned image in accordance with an embodiment of the present invention.

Binning groups of pixels using the illustrative arrangements of FIGS. 5A-5D may generate binned images with evenly distributed binned pixels (e.g., with even spacing between binned pixels). As shown in FIG. 5E, each given binned pixel may have up to four neighboring binned pixels each located a predetermined distance from the given binned pixel (e.g., binned pixel $B_{bin}$ (5,4) may have neighboring binned pixels $G_{Rbin}$(3, 4) $G_{Bbin}$(5, 2) $G_{Bbin}$(5,6) and $G_{Rbin}$(7, 4) each located two pixels away from binned pixel $B_{bin}$ (5,4)). In other words, the centers of the neighboring binned pixels may each be located a predetermined distance from the center of the given binned pixel. Neighboring binned pixels generated using the pixel groups and weights of FIGS. 5A-5D may be separated by a single pixel (e.g., $R_{bin}$ (3,2) is separated from $G_{Rbin}$(3,4) by a single pixel index at (3,3), $R_{bin}$ (3,2) is separated from $B_{bin}$ (5,4) by a single pixel index at (4,3), and $R_{bin}$ (3,2) is separated from $G_{Bbin}$(5,2) by a single pixel index at (5,3)).

Pixel binning may be performed by image processing circuitry 16 in camera module 12. For example, image processing circuitry 16 may receive digital pixel values of a captured image from circuitry 42. The captured image may have a resolution corresponding to the resolution of camera sensor 14. The captured image may have signal levels associated with operation of the circuitry in camera sensor 14 (e.g., a signal level dependent on factors such as ambient lighting conditions, lens properties and settings, gain settings, exposure time settings, pixel sensitivity, etc.). Image processing circuitry 16 may form groups of pixels and generate a binned image by combining image signals from the pixels within each of the groups of pixels (e.g., using the illustrative arrangements of FIGS. 5A-5E). The generated binned image may have a resolution less than the resolution of the captured image and have signal to noise ratios that are greater than the signal to noise ratios of the original (un-binned) captured image.

The pixel binning process may be separated into a horizontal binning process and a vertical binning process. The horizontal binning process and vertical binning process may be performed by image readout circuitry 30 at separate times during image capture.

Camera module 12 may use correlated double sampling (CDS) to sample pixel values from pixels of imager 14. A camera module 12 using correlated double sampling (CDS) to sample pixel values may execute a sample and hold reset (SHR) phase to obtain sample reset values for a particular row of the pixel array. For example, camera module 12 may read an analog reset voltage from each pixel of the pixel row using sample and hold circuitry in circuitry 42, convert the analog reset voltage to a digital reset sample value using analog-to-digital converter circuitry in circuitry 42, and then store the digital sample reset value (e.g., in a reset line buffer or an analog-to-digital buffer). Camera module 12 may perform horizontal binning during the sample and hold (SHR) reset phase. For example, camera module 12 may combine the analog reset values of adjacent pixels before performing analog to digital conversion. Camera module 12 may read a signal voltage from each pixel of the pixel row by executing a sample and hold signal (SHS) phase to obtain sample signal values for a particular row of the pixel array. For example, camera module 12 may read an analog signal voltage from each pixel of the pixel row using sample and hold circuitry in circuitry 42, convert the analog signal voltage to a digital signal value using analog-to-digital converter in circuitry 42, and then store the digital signal sample value (e.g., in a signal line buffer or analog-to-digital converter buffer). Camera module 12 may perform horizontal binning during the sample and hold (SHR) signal phase. For example, camera module 12 may combine the analog signal values of groups of pixels before performing analog to digital conversion. Camera module 12 may use image processing circuitry 16 to produce a correlated double sampling (CDS) value from a combination of the reset sample value and the signal sample value (e.g., from the difference between the reset sample value and the signal sample value).

Figure 6:
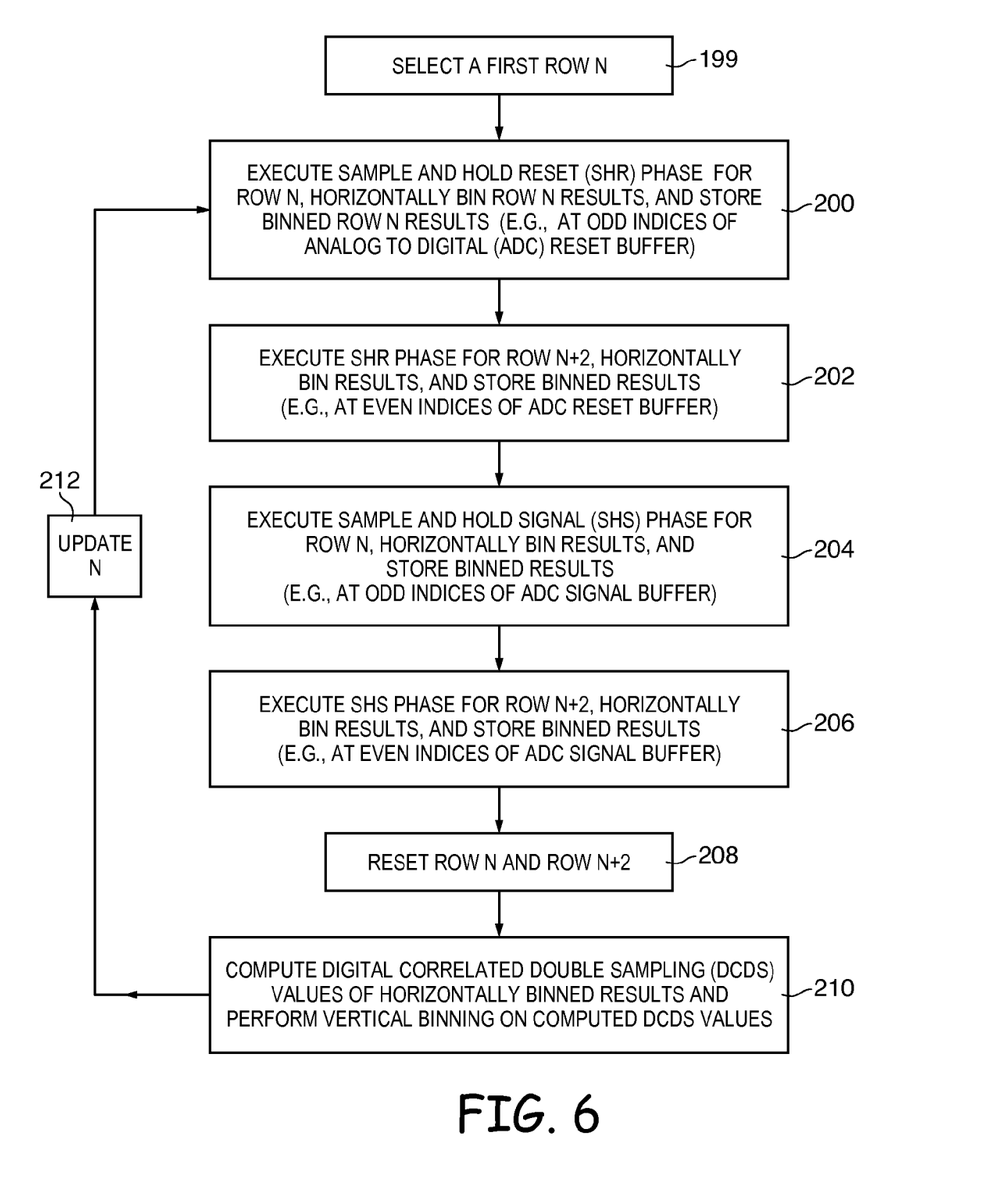
FIG. 6 is a flow chart of illustrative steps involved in performing pixel binning with an imager in accordance with an embodiment of the present invention.

The pixel binning process of FIGS. 5A-5D may be performed by circuitry such as circuitry 42 of FIG. 2 inside camera sensor 14 and image processing circuitry 16. The steps of the flow chart of FIG. 6 illustrate an arrangement in which circuitry in camera module 12 is used to perform pixel binning. The steps of the flow chart of FIG. 6 may be described in reference to the pixel array of FIGS. 3 and 5A-5E (e.g., a pixel array with the row and column arrangement of FIG. 3).

During the operations of step 199, a first row N of the pixel array may be selected.

During the operations of step 200, a sample and hold reset (SHR) phase for row N may be executed (e.g., reset voltages for the pixels of row N may be read from the pixel array, the reset voltages (e.g., the reset signals) for the pixels of row N may be horizontally binned, and the horizontally binned sampled reset values for the pixels of row N may be stored in analog or digital form in an analog-to-digital reset buffer). The reset values for the pixels of row N may be horizontally binned by appropriately scaling and summing pixels of the same color. For example, a group of three green-red pixels (e.g., $G_R(1,2)$, $G_R(1,4)$, and $G_R(1,6)$) of the first row (i.e., N=1) of FIG. 5A may be given respective weights 0.25, 0.5, and 0.25. A horizontally binned sample reset value for the pixels of row N may be obtained by multiplying each of the three green-red pixels in row N by their corresponding weight (e.g., the weights in the arrangements of FIGS. 5A-5D) and summing the results (i.e., $G_R(1,2)*0.25+G_R(1,4)*0.5+G_R(1,6)*0.25$). Each group of pixels used for horizontal binning may overlap with other groups of pixels (e.g., a group of three green-red pixels $G_R(1,2)$, $G_R(1,4)$, and $G_R(1,6)$ may overlap with an adjacent group of two red pixels R(1,1) and R(1,3). In other words, each pixel used for horizontal binning may be used to determine multiple binned pixel values. For example, the image signal from green-red pixel $G_R(1,6)$ may be used to calculate $G_{Rbin}(3,4)$ in a first horizontal binning process and $G_{Rbin}(3,8)$ in a second horizontal binning process. By reusing pixels, the horizontal binning process may produce more evenly spaced horizontally binned images. The summed results for the pixels of row N may be stored in circuitry 42 (e.g., in an ADC reset buffer in circuitry 42). The total number of summed results for the pixels of row N may be less than the number of available indices in the ADC reset buffer. The summed results for the pixels of row N may be stored at odd indices of the ADC reset buffer (e.g., at indices 1, 3, 5, 7, etc.).

During the operations of step 202, image readout circuitry 30 may execute a sample and hold reset (SHR) phase for row N+2 (e.g., image readout circuitry 30 may read analog reset values from the pixels of row N+2, horizontally bin the analog reset values for the pixels of row N+2, convert the analog reset values for the pixels of row N+2 to digital reset values, and store the digital reset values for the pixels of row N+2). To horizontally bin the analog reset values for the pixels of row N+2, the pixels of row N+2 may be arranged in groups and the pixels of each group may be given corresponding weights. The analog reset values associated with the pixels of each group may be scaled by their corresponding weights and the resulting scaled values may be summed to obtain the horizontally binned analog reset values. The horizontally binned analog reset values may be converted from analog values to digital values by analog to digital converter (ADC) circuitry in circuitry 42. The horizontally binned digital reset values may be stored in circuitry 42 (e.g., in line buffers or ADC reset buffers). The binned digital reset values for the pixels of row N+2 may be stored at even indices of an ADC reset buffer (e.g., at indices 2, 4, 6, 8, etc).

During the operations of step 204, image readout circuitry 30 may execute a sample and hold signal (SHS) phase for row N. During the sample and hold signal (SHS) phase, image readout circuitry 30 may read signal values from the pixels of row N that reflect the amount of light absorbed by the pixels. To prepare for correlated double sampling, the signal values may also be horizontally binned with the same process that the reset values of row N were horizontally binned (e.g., the pixel groupings and pixel weights of step 204 may be equivalent to the pixel groupings and pixel weights of step 200). The horizontally binned signal values for the pixels of row N may be stored (e.g., at odd indices of an ADC signal buffer).

During the operations of step 206, image readout circuitry 30 may execute a sample and hold signal (SHS) phase for row N+2. During the sample and hold signal (SHS) phase for row N+2, image readout circuitry 30 may read signal values from the pixels of row N+2 that reflect the amount of light absorbed by the pixels. To prepare for correlated double sampling, the signal values may also be horizontally binned with the same process that the reset values of row N+2 were horizontally binned (e.g., the pixel groupings and pixel weights of step 206 may be equivalent to the pixel groupings and pixel weights of step 202). The horizontally binned signal values for the pixels of row N+2 may be stored (e.g., at even indices of an ADC signal buffer).

During the operations of step 208, camera module 12 may perform a reset operation on row N and row N+2 of imager 14. The reset operation may prepare row N and row N+2 for capture of subsequent images (e.g., the reset operation may reset internal voltages of each pixel of row N and row N+2).

During the operations of step 210, image processing circuitry 16 may compute digital correlated double sampling (DCDS) values of the horizontally binned values for the pixels of rows N and N+2. The DCDS values for each row may be computed from the difference between the stored reset values for that row and the stored signal values for that row (e.g., the stored reset values may be subtracted from the stored signal values). The computed DCDS values may reflect horizontally binned values (e.g., the reset values and signal values may have already been horizontally binned in steps 200-206).

Image processing circuitry 16 may perform vertical binning on the computed DCDS values. For vertical binning of green-red pixels and red pixels, image processing circuitry 16 may form groups of three rows (e.g., in the arrangements of FIGS. 5A and 5C) and assign corresponding weights to the rows of each group (e.g., a center row (N=3) may be assigned weight 1, a top row (N=1) may be assigned weight 0.5, and a bottom row (N=5) may be assigned weight 0.5). Each row may reflect the DCDS values of a horizontally binned row of the original captured image. The rows of each group may be scaled by their corresponding weights and vertically binned pixel values may be computed by summing the scaled rows.

For vertical binning of green-blue pixels and blue pixels, image processing circuitry 16 may form groups of two rows (e.g., in the arrangements of FIGS. 5B and 5D) and assign corresponding weights to the rows of each group (e.g., a top row (N=1) and a bottom row (N=1) may be assigned weight 1). Each row may reflect the DCDS values of a horizontally binned row of the original captured image. The rows of each group may be scaled by their corresponding weights and vertically binned pixel values may be computed by summing the scaled rows.

During the operations of step 212, row N may be updated to process a subsequent row (e.g., N may be set equal to N+1 or N+3). A row N that currently reflects a row with red pixels and green-red pixels may be updated to row N+1 to reflect a row with blue pixels and green-blue pixels. A row N that currently reflects a row with blue pixels and green-blue pixels may be updated to row N+3 to reflect a row with red pixels and green-red pixels.

Figure 7A:
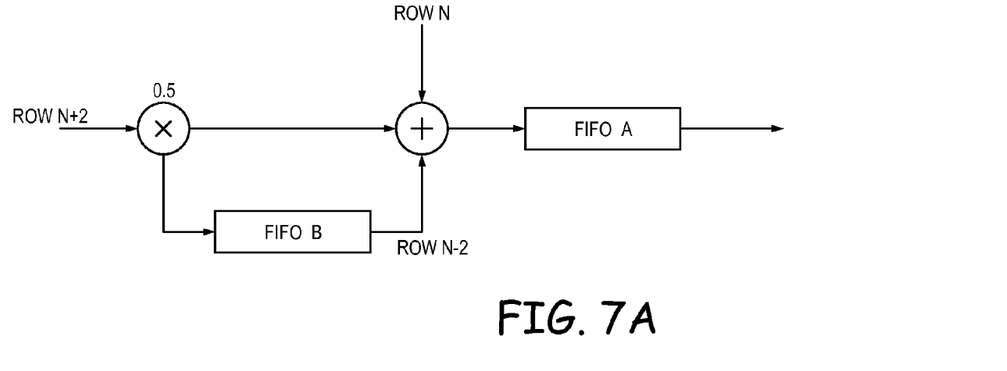
FIG. 7A is a diagram of an illustrative implementation of centered pixel row binning in accordance with an embodiment of the present invention.

A row readout arrangement for vertical binning of rows with red pixels and green-red pixels is shown in FIG. 7A. In the arrangement of FIG. 7A, the bottom pixel row (row N+2) of each group of rows may be scaled by a corresponding row weight and the scaled row may be stored in a first-in-first-out buffer (e.g., FIFO B). The scaled rows stored in FIFO B may be used as the top rows for vertical binning of subsequent groups of rows. For example, the bottom row (row 5) of a first group of rows (row 1, row 3, and row 5 of FIG. 3) may be scaled by 0.5 and stored in FIFO B. The scaled row (row 5) may be read from FIFO B and used as the top row (row 5) of a second group of rows (row 5, row 7, and row 9 of FIG. 3). Vertically binned values of each group may be computed by summing a scaled bottom row (e.g., row 9 multiplied by row weight 0.5), a scaled row stored in FIFO B (e.g., row 5 multiplied by 0.5), and a center row (e.g., row 7). The vertically binned values may be stored in a FIFO A. By performing vertical and horizontal binning of rows with red pixels and green-red pixels, the binned values $R_{bin}$ and $G_{Rbin}$ of FIG. 5E may be computed.

Figure 7B:
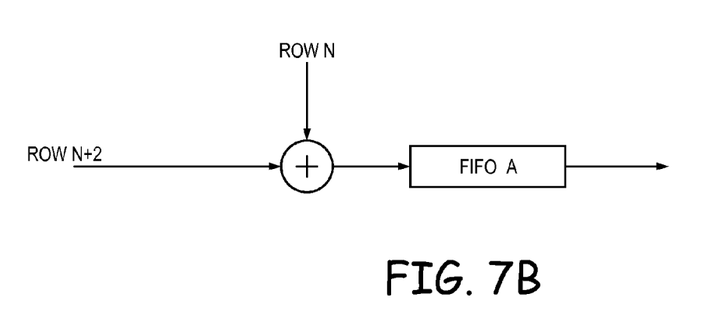
FIG. 7B is a diagram of an illustrative implementation of averaged pixel row binning in accordance with an embodiment of the present invention.

A row readout arrangement for vertical binning of rows with blue pixels and green-blue pixels is shown in FIG. 7B. In the arrangement of FIG. 7B, a first row (N) may be added to a second row (N+2) and stored in a FIFO A.

Various embodiments have been described illustrating an electronic device that may contain an imager formed from a pixel array. The imager may be configured to perform pixel binning on an image captured by the pixel array. The pixel binning operation may reduce the resolution of the captured image and increase signal-to-noise ratios of the captured image. Pixel binning may be performed by forming groups of pixels and combining sampled values (e.g., image signals and reset signals) from the pixels in each group. The sampled values from the pixels may be combined by assigning weights to each pixel, scaling the sampled values by the corresponding weights, and summing the scaled values. The groups of pixels and pixel weights may be selected to produce binned images with even spatial distribution.

The pixel binning operation may be performed by processing circuitry that receives captured image data from the imager. The pixel binning operation may also be separated into a horizontal binning step and a vertical binning step that are performed by image readout circuitry during image readout. During the horizontal binning step, pixels of a particular row may be combined. During the vertical binning step, pixel rows may be combined. The horizontal binning step may be performed on analog sample values during image readout. The vertical binning step may be performed on digital sample values during image readout.

The foregoing is merely illustrative of the principles of this invention which can be practiced in other embodiments.

What is claimed is:

1. A method for binning image signals from pixels of an image sensor, comprising:
   computing, from the image signals from the pixels of the image sensor, binned pixel values with processing circuitry; and
   forming a binned image from the binned pixel values, wherein the binned pixel values are evenly distributed within the binned image wherein the image signals comprise image signals from a first group of pixels formed from a first number of pixels associated with a first pixel type and image signals from a second group of pixels formed from a second number of pixels associated with a second pixel type, wherein the second number is different from the first number, and wherein computing the binned pixel values comprises:
      with the processing circuitry, scaling the image signals associated with the first group of pixels by a first set of corresponding weights.

2. The method defined in claim 1, wherein computing the binned pixel values further comprises:
   with the processing circuitry, summing the scaled image signals associated with the first group of pixels.

3. The method defined in claim 1, wherein computing the binned pixel values further comprises:
   with the processing circuitry, scaling the image signals associated with the second group of pixels by a second set of corresponding weights.

4. The method defined in claim 3, wherein computing the binned pixel values further comprises:
   with the processing circuitry, summing the scaled image signals associated with the second group of pixels.

5. The method defined in claim 1 wherein forming the binned image comprises forming the binned image with binned pixels values arranged in a Bayer pattern.

6. The method defined in claim 1, wherein the pixels of the image sensor are arranged in a Bayer pattern and wherein forming the binned image comprises forming the binned image with binned pixels values arranged in the Bayer pattern.

7. The method defined in claim 6 wherein the pixels of the image sensor are arranged in an array having columns, even rows, and odd rows, wherein the pixels of the odd rows comprise red pixels and first green pixels, wherein the pixels of the even rows comprise blue pixels and second green pixels, wherein computing the binned pixel values comprises:
   computing a plurality of first green binned pixel values;
   computing a plurality of red binned pixel values;
   computing a plurality of blue binned pixel values; and
   computing a plurality of second green binned pixel values.

8. The method defined in claim 7 wherein:
   computing the plurality of first green binned pixel values comprises, for each first green binned pixel value of the plurality of first green binned pixel values, computing that first green binned pixel value using image signals from nine first green pixels that are located within three different columns of the array and three different odd rows of the array;
   computing the plurality of second green binned pixel values comprises, for each second green binned pixel value of the plurality of second green binned pixel values, computing that second green binned pixel value using image signals from only four second green pixels that are located within two different columns of the array and two different even rows of the array;
   computing the plurality of red binned pixel values comprises, for each red binned pixel value of the plurality of red binned pixel values, computing that red binned pixel value using image signals from only six red pixels that are located within two different columns of the array and three different odd rows of the array; and
   computing the plurality of blue binned pixel values comprises, for each blue binned pixel value of the plurality of blue binned pixel values, computing that blue binned pixel value using image signals from only six blue pixels that are located within three different columns of the array and two different even rows of the array.

9. Circuitry comprising:
   an image sensor having a plurality of pixels arranged in rows and columns;
   image processing circuitry operable to produce a binned image having rows and columns, wherein the image processing circuitry is operable to produce the binned image such that at least one of the rows of the binned image is adjacent to two rows of the binned image and is separated from each of those two rows by a first given distance, wherein the pixels of the image sensor include first green pixels, red pixels, second green pixels, and blue pixels, wherein the binned image includes first green binned pixels, red binned pixels, second green binned pixels, and blue binned pixels, wherein the image processing circuitry is operable to produce each of the first green binned pixels of the binned image from image signals from nine of the first green pixels of the image sensor, and wherein the image processing circuitry is operable to produce each of the second green binned pixels of the binned image from image signals from only four of the second green pixels of the image sensor.

10. The circuitry defined in claim 9 wherein the image processing circuitry is operable to produce the binned image such that at least one of the columns of the binned image is adjacent to two columns of the binned image and is separated from each of those two columns by a second given distance.

11. The circuitry defined in claim 9 wherein the image processing circuitry is operable to produce each of the red pixels of the binned image from image signals from only six of the red pixels of the image sensor.

12. The circuitry defined in claim 11 wherein the image processing circuitry is operable to produce each of the blue pixels of the binned image from image signals from only six of the blue pixels of the image sensor.

13. The circuitry defined in claim 9 wherein the image processing circuitry processes all of the pixels of the image sensor in producing the binned image.

* * * * *